United States Patent [19]

Welch

[11] Patent Number: 4,501,380

[45] Date of Patent: Feb. 26, 1985

[54] SPIRAL FEEDER FOR HEADED FASTENERS

[75] Inventor: Alfred F. Welch, Renton, Wash.

[73] Assignee: The Boeing Company, Seattle, Wash.

[21] Appl. No.: 431,251

[22] Filed: Sep. 30, 1982

[51] Int. Cl.³ .............................................. B65G 11/06
[52] U.S. Cl. ...................................... 221/298; 193/12
[58] Field of Search .............. 221/172, 173, 301, 298, 221/290, 75, 165, 171; 198/778, 382, 383; 193/12; 209/586, 911, 938, 929; 10/155 R, 155 A

[56] References Cited

U.S. PATENT DOCUMENTS

| | | |
|---|---|---|
| 1,863,314 | 6/1932 | Phelps et al. . |
| 2,327,401 | 3/1943 | Chilton . |
| 2,570,903 | 10/1951 | Yost . |
| 2,621,824 | 12/1952 | Gookin . |
| 2,918,163 | 12/1959 | Willis . |
| 3,082,886 | 3/1963 | Maude . |
| 3,276,625 | 10/1966 | Ziskal ............................ 221/301 X |
| 3,448,507 | 6/1969 | Jackson et al. . |
| 3,523,316 | 8/1970 | Alexander . |
| 3,618,192 | 11/1971 | Hoffken . |
| 3,789,490 | 2/1974 | Kohart . |
| 3,851,369 | 12/1974 | Eschholz . |
| 3,956,812 | 5/1976 | Kawakami et al. . |
| 3,995,359 | 12/1976 | Randolph . |
| 4,014,460 | 3/1977 | Bryan, Jr. ......................... 221/156 |
| 4,269,302 | 8/1981 | Garvey . |

Primary Examiner—Stanley H. Tollberg
Attorney, Agent, or Firm—Christensen, O'Connor, Johnson & Kindness

[57] ABSTRACT

Disclosed is an automatic feed system for storing and delivering headed fasteners, such as bolts or headed rivets to a fastening machine. The feed system is configured to release fasteners one at a time in a shank-first orientation and includes a cylindrical feed column that is attached to a gate unit. A cylindrical magazine that holds a supply of fasteners and permits rapid reloading mounts atop the feed column. The outer surface of the feed column and magazine include aligned, downwardly extending helical channels to hold the fasteners in a single-file row that advances downwardly under the force of gravity each time the gate unit is activated to eject a single fastener. Fasteners dispensed by the gate unit travel downwardly into a pneumatic supply line and are directed to the fastening machine that utilizes the feed system. A release mechanism located at the lower end of the magazine is used to retain the fasteners in the helical channel of the magazine when the magazine is separated from the feed column.

14 Claims, 16 Drawing Figures

Fig. 7.

SPIRAL FEEDER FOR HEADED FASTENERS

BACKGROUND OF THE INVENTION

This invention relates to methods and apparatus for supplying headed fasteners such as bolts or rivets to a fastening machine, and more particularly to a mechanism wherein headed fasteners are released one at a time and are supplied to an automatic fastening machine in a predetermined orientation.

Automatic fastening machines, i.e., machines that automatically insert fasteners into a part for assembly purposes, are used in a variety of industrial applications. For example, in the aircraft industry machines that automatically drill a hole and install a fastener are used in fabricating wing spar subassemblies and other portions of the aircraft.

Some automatic fastening machines require large capacity fastener feed systems to ensure that an adequate supply of fasteners are available for use in the fastening machine. The large capacity feed systems currently in use are often expensive, and are of such a large size and weight that it is often necessary to mount the feed system remotely from the fastening machine. One type of such large capacity feed systems utilizes vibratory bowl-type feeders such as is disclosed in U.S. Letters Pat. No. 2,918,163 to Willis.

While large capacity fastener feed systems perform adequately in the intended environment, other automatic fastening machines require fewer fasteners and are adequately serviced by a limited capacity fastener feed system. The drawbacks of using a large capacity feed system on an automatic fastening machine requiring a more limited number of fasteners include the excessive cost involved and the excessive use of space to mount the feed system. Another drawback of a large capacity feed system using a vibratory bowl-type feeder in such an application is that the feeder must be supplied with electricity or another type of power.

An additional consideration in the design of both large and limited capacity fastener feed systems is that automatic fastening machines that use headed fasteners, e.g., bolts or head-type rivets often require that the fasteners be supplied in a particular orientation. Even further, it is usually desirable that a fastener feed system for headed fasteners be configured for handling fasteners of various shank or grip lengths.

Accordingly, it is an object of this invention to provide a fastener feed system for use on an automatic fastening machine that is relatively inexpensive to manufacture, install and operate. Another object of this invention is to provide a fastener feed system of limited size and weight that can be mounted directly on or in close proximity to an automatic fastening machine. It is a further object of this invention to provide a fastener feed system that is capable of handling headed fasteners of different grip lengths and that will deliver such fasteners to the fastening machine in a particular orientation.

SUMMARY OF THE INVENTION

The foregoing and other objects are achieved in accordance with this invention by a spiral feeder assembly that stores and delivers headed fasteners to a fastening machine. In the basic embodiments, the spiral feeder assembly includes a gate unit that causes the feeder to release one headed fastener at a time and a feed column that extends upwardly from the gate unit. The feed column has a helical delivery channel for holding a row of headed fasteners in a shank down orientation and delivering the fasteners sequentially to the gate unit without application of any force except gravity.

In the more detailed and currently preferred embodiments of the invention, the spiral feeder assembly includes a magazine configured for interconnection with the feed column. The magazine in effect forms an extension of the feed column and includes a helical storage channel for storing a row of headed fasteners. The configuration of the helical delivery and storage channels of the feed column and magazine allow fasteners of various grip length to be handled by the spiral feeder assembly. The lower end of the magazine includes a release mechanism that acts to block the helical storage channel when the magazine is not interconnected with the feed column and thereby retain a supply of headed fasteners within the magazine. The release mechanism is actuated to unblock the storage channel when the magazine is interconnected with the feed column.

In operation, gravity moves the fasteners downwardly along the helical groove of the feed column (and, in embodiments in which they are employed, the magazine) each time the gate unit ejects a fastener. To supply the fasteners in a shank-first orientation (head last) to a fastening machine, the fasteners enter a slot formed in the upper surface of a gate body of the gate unit. This slot, in effect, forms an extension of the helical groove, to maintain the fasteners in a shank down orientation as they move through the gate body. The slot terminates at a cylindrical chute that passes downwardly through the gate body and connects to a feed tube that is routed to the fastening machine.

The ejection of one headed fastener at a time through the gate unit is controlled by solenoid operation of an escapement and an interconnected feeder fork. The escapement is pivotally connected to the gate body and includes first and second arms that alternately block the slot in the gate body while allowing a single fastener to pass into the slot of the gate body during each operative cycle of the escapement, i.e., with each energization and deenergization of the solenoid. The feeder fork is slidingly mounted to the gate body so that the two parallel arms forming the feeder fork can partially obstruct the chute through the gate body by having the inner edge of each arm extend through diametrically opposed portions of the surface forming the chute. When the solenoid is in a de-energized state, the plunger of the solenoid is extended and the escapement is in a detail position with its first arm extending into the slot so that the lowermost fastener in the row of fasteners does not advance down the slot. At this time the feeder fork is also in a detain position with its parallel arms partially obstructing the chute, so that the shank of a fastener entering the chute from the slot can pass between the parallel arms, but the head of the fastener cannot. Thus, any fastener within the chute is maintained in a shank down orientation, being suspended by its head from the feeder fork.

When the solenoid is energized, the escapement pivots into a release position with the first arm passing from the slot and the second arm rotating into a position wherein it blocks the slot. When the escapement reaches the release position, the second arm blocks the slot at a location approximately one fastener diameter below the location at which the first arm blocked the slot when the escapement was in the detain position.

Thus, as the escapement is pivoted between the detain and release position, the row of fasteners advances along the slot by a distance that substantially corresponds to one fastener position. At the same time, the solenoid pulls the feeder fork into a release position wherein its parallel arms no longer block the chute through the gate body. This allows the fastener that is suspended from the parallel arms of the feeder fork to fall downwardly through the chute and into the feed tube that is connected to the bottom of the chute. Since the chute and feed tube are sized to prevent tumbling of the fastener, the fastener is supplied to the fastening machine in a shank first orientation.

When the solenoid is de-energized, the escapement pivots back to the detain position with the second arm passing from the slot while the first arm rotates through an arcuate path and passes between the two lowermost fasteners to encircle the lowermost fastener and allow it to slide down the slot and enter the chute. At this point of the sequence, the feeder fork is moving back into the detain position and the fastener is suspended between the parallel arms of the feeder fork in the previously mentioned shank down orientation. With the feeder fork and the escapement in the detain position, the gate unit is once again ready to release a single fastener upon energization of the solenoid controlling the escapement and feeder fork.

BRIEF DESCRIPTION OF THE DRAWINGS

Other objects and advantages of the present invention will become apparent to one skilled in the art after a reading of the following description taken together with the accompanying drawing in which.

DETAILED DESCRIPTION

Figures 1, 2, 3:
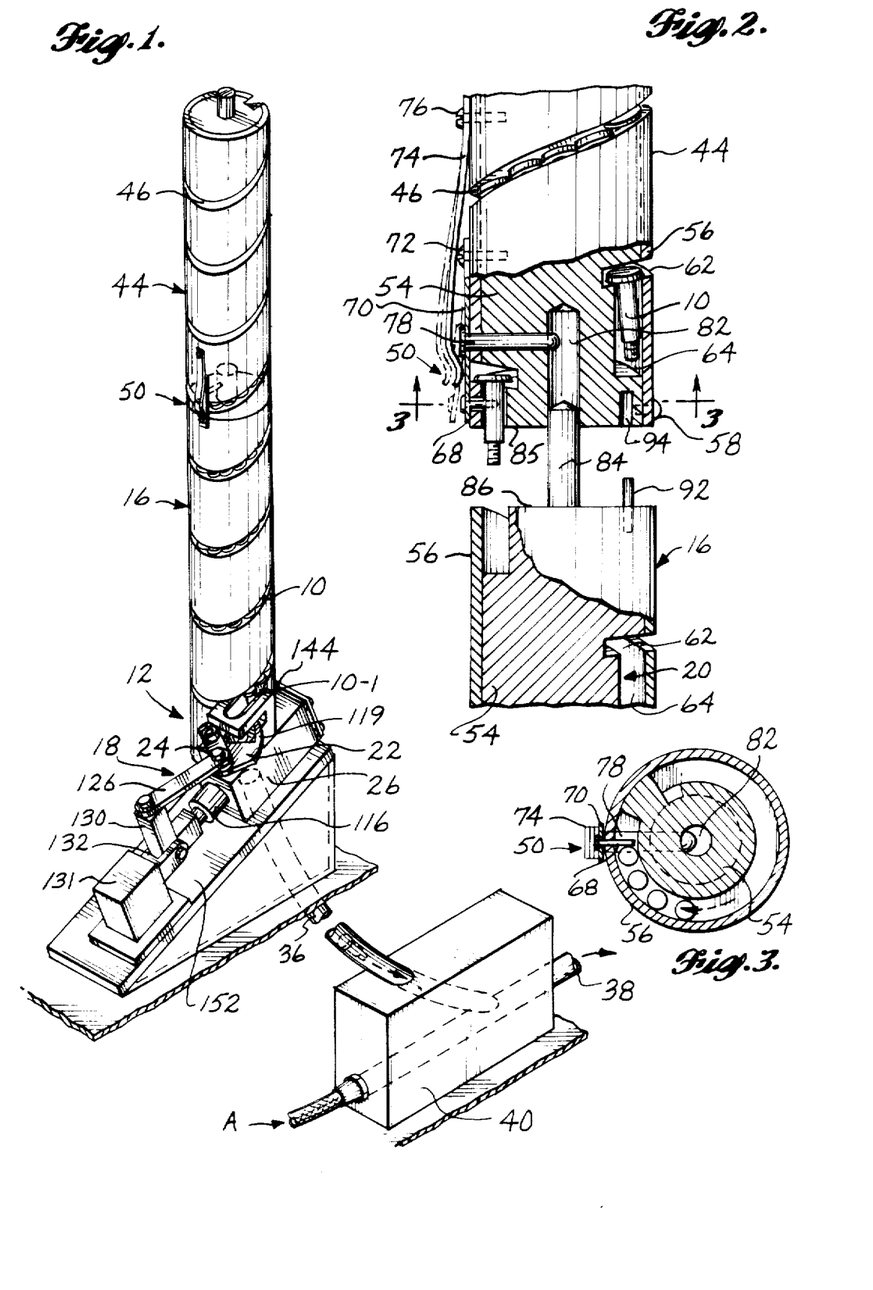
FIG. 1 is a perspective view of a spiral feeder assembly constructed in accordance with this invention.
FIG. 2 is a side elevational view of the lower portion of the upper magazine and the upper portion of the feed column of the spiral feeder of FIG. 1, with a portion of each member being cut away to show the internal structure.
FIG. 3 is a sectional plan view of the upper magazine taken along section line 3—3 of FIG. 2.

FIG. 1 depicts an automatic delivery system that is constructed in accordance with this invention and is configured and arranged for supplying a headed fastener, such as a bolt or rivet, to a remote fastening machine (not shown in FIG. 1) each time the delivery system is activated by the fastening machine operator, or, in the case of a numerically controlled fastening machine, by an automatic control circuit. As shall be described in more detail hereinafter, in the depicted delivery system the fasteners (generally denoted by the numeral 10) are stored in and dispensed by a spiral feeder assembly 12 that includes a cylindrical feed column 16 that extends upwardly from a gate unit 18. A downwardly extending helical delivery channel 20 that is formed in the peripheral region of feed column 16 maintains the fasteners 10 in a single-file progression or series and allows the stored fasteners to be urged downwardly and into gate unit 18 by the force of gravity.

Figure 8:
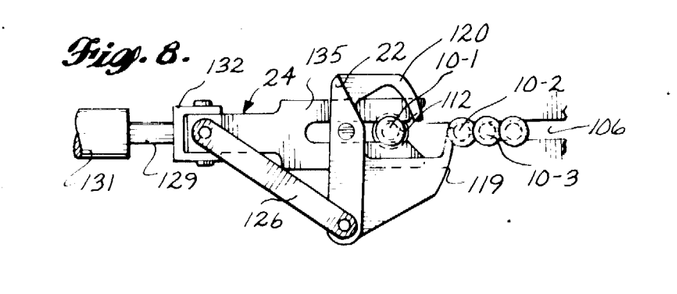
FIG. 8 is a schematic plan view of a portion of the gate unit showing the first stage of the operational sequence by which the spiral feeder assembly releases a single headed fastener.
Figure 9:
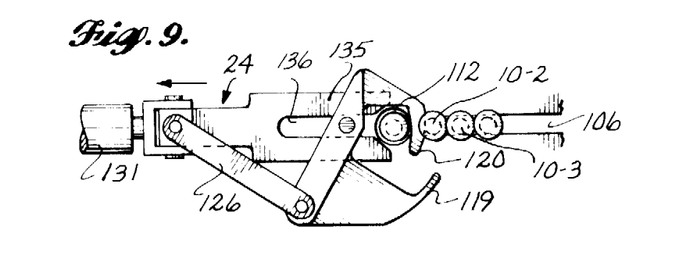
FIG. 9 is a schematic plan view of a portion of the gate unit showing the second stage of the operational sequence by which the spiral feeder assembly releases a single headed fastener.
Figure 10:
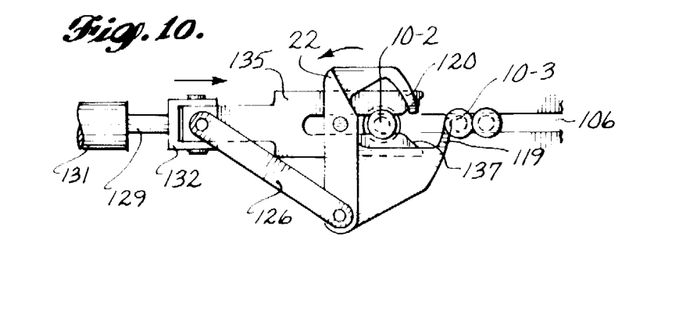
FIG. 10 is a schematic plan view of a portion of the gate unit showing the initial stage of the operational sequence of the spiral feeder assembly.

As shall be described in detail relative to FIGS. 8–10, the gate unit 18 releases one fastener 10 at a time by coordinating the movement of an escapement 22 and a feeder fork 24. The escapement 22 is pivotally mounted on a gate body 26 of gate unit 18 and holds back the single-file row of fasteners that is supplied via helical delivery channel 20.

As indicated by phantom lines in FIG. 1, each fastener 10 that is released by gate unit 18 passes downwardly through a feed tube 36 and into a pneumatic feed line 38 that is coupled to the fastening machine being utilized in conjunction with the depicted embodiment of the invention. In the arrangement shown, the junction between the feed tube 36 and the pneumatic feed line 38 is formed by a rectangular junction block 40. A conventional solenoid-operated valve or other means introduces a short blast of air (arrow A) into penumatic feed line 38 each time gate unit 18 is operated to urge the released fastener on to the fastening machine.

Turning now to the more detailed structural aspects of the invention, a major portion of spiral feeder assembly 12 of FIG. 1 is formed by a cylindrical magazine 44 that is configured to engage with and mount atop feed column 16 to, in effect, form an extension of the feed column. The function of magazine 44 is to hold a supply of headed fasteners 10 for use in the spiral feeder assembly 12. By having a detachable magazine 44, a supply of magazines can be filled with fasteners 10 at a location remote from the delivery system and held ready for use with spiral feeder assembly 12. Since feed column 16 includes a supply of fasteners 10, an empty magazine 44 can be replaced without interrupting operation of the delivery system.

Magazine 44 is similar in construction to feed column 16 and has a substantially identical diameter. Magazine 44 includes a downwardly extending helical storage channel 46 that is formed at the periphery of the magazine to hold a single-file row of stored fasteners 10. As is best shown by FIG. 2, when magazine 44 is not engaged with feed column 16, the row of stored fasteners 10 is prevented from advancing along storage channel 46 by a release mechanism 50. Once magazine 44 is engaged with feed column 16, release mechanism 50 is actuated and the row of fasteners held in magazine 44 is released for downward advancement into delivery channel 20 of feed column 16. In the preferred embodiment of the invention, magazine 44 is approximately twice the length of feed column 16 to provide a sufficient supply of fasteners to spiral feeder assembly 12, and to minimize the number of magazines that must be used in any particular fastening operation.

With continued reference to FIG. 2 (wherein corresponding components of magazine 44 and feed column 16 are identified by the same reference numerals), feed column 16 and magazine 44 preferably are formed from a cylindrical core 54 made of an easily machined strong material, such as nylon, that also has a relatively low coefficient of friction to allow free sliding movement of the row of fasteners 10 held in the delivery and storage channels 20 and 46. Cylindrical core 54 is coaxially retained within a snugly fitting cylindrical shell 56 made of another easily machined material, e.g., a polycarbonate resin such as the material commercially available under the trademark LEXAN and manufactured by the General Electric Company, Pittsfield, Mass. Screws 58 or other conventional methods of attachment such as adhesives are employed to secure shell 56 to core 54.

Still referring to FIG. 2, delivery channel 20 of feed column 16 and storage channel 46 in magazine 44 both are of a substantially T-shaped cross-sectional geometry that allows headed fasteners 10 to hang by their heads in a shank down position as they travel down the channels. As can be seen in FIG. 2, the upper, transverse portion 62 of channels 20 and 46 is not perpendicular to the vertically extending portion 64, but slants downwardly and inwardly in a manner that reduces or minimizes contact between the headed fasteners 10 and the surfaces of channels 20 and 46. In particular, as is shown in FIG. 2, contact between each fastener 10 and the surfaces of channels 20 and 46 is limited to three points or small regions that are located on the outside portion of the lower surface of the fastener head, the upper, inner region of the fastener shank, and the lower, outer portion of the end of the shank. Configuring channels 20 and 46 to support fasteners 10 in this manner reduces the frictional drag imposed on each headed fastener 10 so that it slides freely down the channels under the force of gravity and without additional urging or vibration of the spiral feeder assembly 12.

The previously mentioned release mechanism 50 of FIG. 2 is formed in the lower portion of magazine 44 and is configured to release the row of stored fasteners 10 when magazine 44 is engaged with feed column 16. As can be seen in FIGS. 2 and 3, release mechanism 50 includes a stop pin 68 that extends radially through cylindrical shell 56 into magazine 44, with the shank of pin 68 projecting into the terminal region of storage channel 46 to prevent passage of the stored fasteners 10 when stop pin 68 is pressed or urged radially inward.

The head of stop pin 68 is attached to the lower end of a relatively narrow, relatively flat strip 70 that extends axially along the outer surface of magazine 44 and is attached by a screw 72 at the upper end of the strip. A leaf spring 74, which is attached to the outer surface of magazine 44 by a second screw 76, extends axially along and over strip 70 to press strip 70 against the outer surface of the magazine and urge stop pin 68 radially inward so as to retain the stored fasteners 10 within magazine 44. Release mechanism 50 can be configured by forming strip 70 from a resilient material such as spring steel so that strip 70 acts as a spring to urge stop pin 68 radially inward, thereby eliminating leaf spring 74.

When a magazine 44 is engaged with feed column 16, a release pin 78 that is attached to strip 70 moves stop pin 68 outwardly to allow the fasteners to flow from magazine 44. More specifically, release pin 78 extends radially inward through magazine 44, with the outer end or head of release pin 78 being secured to the central portion of strip 70 and the inner end of release pin 78 projecting into an alignment aperture 82 that extends upwardly along the axial centerline of magazine 44. When magazine 44 is installed on feed column 16, an alignment pin 84 that extends upwardly from the top surface 86 of feed column 16 along the axial centerline of the feed column passes into alignment aperture 82. As the bottom surface 85 of magazine 44 moves into abutment with top surface 86 of feed column 16, the upper end of alignment pin 84 bears against the inner end of release pin 78 to push it radially outward. This forces both release pin 78 and strip 70 radially outward (phantom line in FIG. 2), thereby retracting stop pin 68 from storage channel 46 and releasing the stored fasteners 10 for downward movement from magazine 44 into delivery channel 20 of feed column 16.

In the currently preferred embodiment, the outer end of release pin 78 is threadably engaged with strip 70. In this arrangement, the point at which release pin 78 causes the stored fasteners 10 to be released can be adjusted by screwing the release pin inward or outward from strip 70. In addition, to ensure that the lower end of storage channel 46 and the upper end of delivery channel 20 are precisely aligned when magazine 44 is installed on feed column 16, the depicted embodiment includes a second locator pin 92 that is mounted in the outer region of top surface 86 of feed column 16 and is received by a complementary locator hole 94 that is positioned in the outer region of bottom surface 85 of magazine 44.

Figure 4:
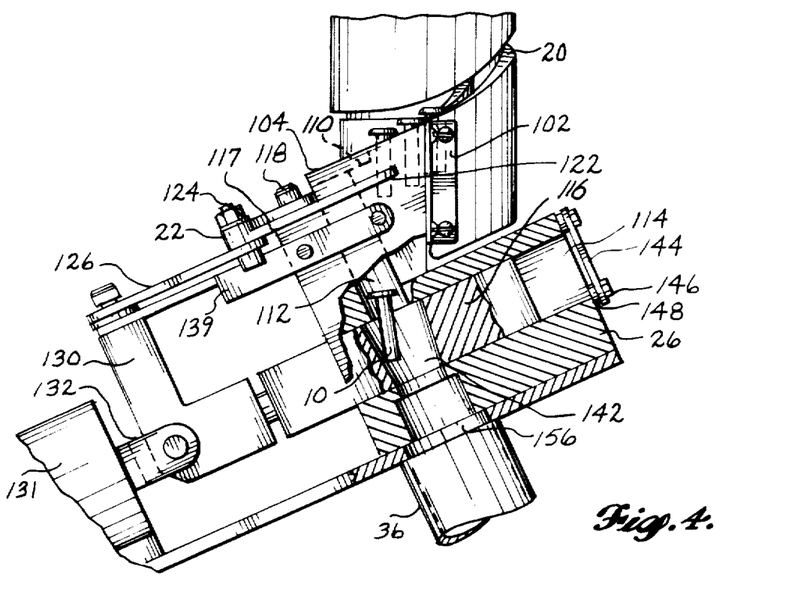
FIG. 4 is a side elevational view of the gate unit and the lower end of the feed column with a portion of the gate unit cut away.
Figure 5:
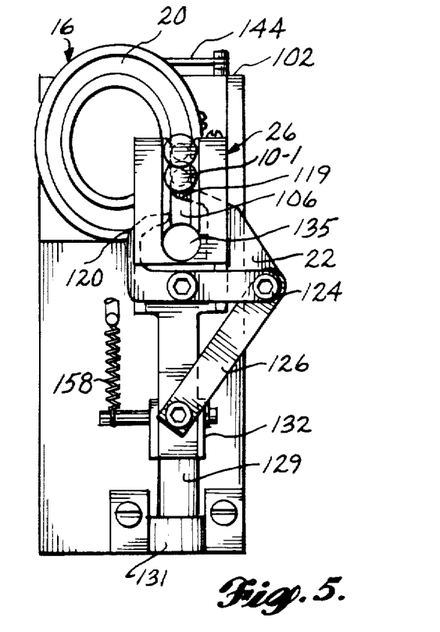
FIG. 5 is a plan view of the gate unit and a sectional plan view of the feed column with the gate unit being shown in the inactivated condition.
Figure 6:
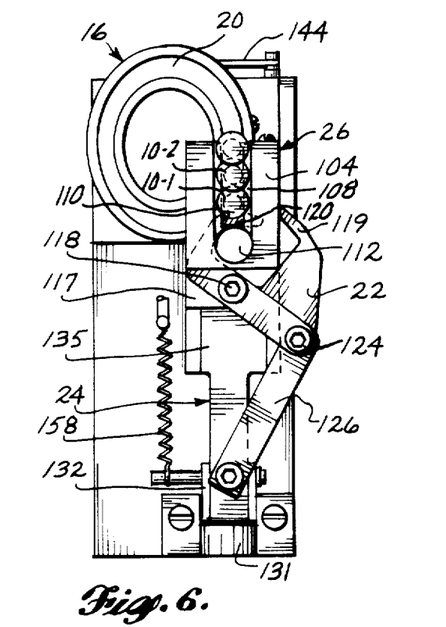
FIG. 6 is a plan view of the gate unit and a sectional plan view of the feed column with the gate unit being shown in the activated condition for releasing a single fastener.

As mentioned previously, gate unit 18 is attached to the lower end of feed column 16 and is configured for receiving headed fasteners 10 that slide down delivery channel 20. Once fasteners 10 enter gate unit 18, the fasteners are released one at a time for delivery to the fastening machine. As shown in FIGS. 4, 5 and 6, gate unit 18 of the delivery system of FIG. 1 includes a gate body 26 that is attached to feed column 16 by means of bracket 102. Bracket 102 positions gate body 26 so that the upper surface 104 of the gate body is inclined at approximately the same angle as delivery channel 20 to thereby form a ramp-like extension of the delivery channel. When viewed from above, upper surface 104 is substantially "U"-shaped. A slot 106 that imparts the U-shaped geometry to upper surface 104 is aligned with the lower end of delivery channel 20 to receive headed fasteners 10 as they exit the delivery channel. Recessed shoulders 108 along the longitudinal edges of slot 106 support fasteners 10 and cause the fasteners to hang vertically within the slot. Additionally, slot 106 has a step 110 in the direction of fastener travel, shown in phantom lines in FIG. 4. The step 110 is configured to prevent the heads of adjacent fasteners from binding with one another by allowing the lowermost fastener to drop downwardly onto the step and thereby separate from the nextmost fastener.

Slot 106 terminates at a cylindrical chute 112 that passes downwardly through gate body 26 to allow passage of the headed fasteners 10 from the slot to feed tube 36. A cylindrical air valve passage 114 that is orthogonal to chute 112 and disposed about the longitudinal axis of gate body 26 extends the complete length of the gate body. Air valve passage 114 receives an air valve 116 that will be described in more detail later.

The end of upper surface 104 of gate body 26 that is remote from feed column 16 steps down to a surface 117 that is substantially parallel to, but at a height below upper surface 104. Escapement 22 mentioned previously is pivotally mounted to surface 117 by means of a pivot bolt 118 that is aligned with slot 106. In the depicted embodiment of the invention, escapement 22 has first and second arms 119 and 120, that are configured and arranged to control the passage of headed fasteners 10 by allowing one fastener at a time to enter chute 112. First and second arms 119 and 120 swing arcuately through a predetermined angle and pass through slot 106 as escapement 22 pivots between a detain and release position. First and second arms 119 and 120 move within an escapement slot 122 that passes from one side to the other of gate body 26 transverse to slot 106. First arm 119 blocks slot 106 when escapement 22 is in the detain position (FIG. 5), and second arm 120 obstructs slot 106 when escapement 22 is in the release position (FIG. 6). The first and second arms 119 and 120 are configured so that a portion of each arm is obstructing slot 106 as escapement 22 moves between the detain and release positions, thus, slot 106 is continually obstructed by either the first or second arms.

As shown in FIGS. 5 and 6, first arm 119 is farther from pivot bolt 118 than is second arm 120. The difference between the distance from first arm 119 to pivot bolt 118 and the distance from second arm 120 to the pivot bolt is approximately equal to the shank diameter of the fasteners 10 being handled by spiral feeder assembly 12. Thus, during the reciprocating movement of escapement 22, first and second arms 119 and 120 move through arcuate paths having differing radii of rotation. First arm 119 has an elongated, relatively straight configuration and extends generally parallel to the side of escapement 22 that is adjacent pivot bolt 118. Second arm 120 has an elongated, curved shape, with the inner radius of curvature of the arm approximately equal to the radius of curvature of chute 112. The portion of escapement 22 that would lie between pivot bolt 118 and first and second arms 119 and 120 is cut away so that chute 112 is not obstructed by the escapement.

When escapement 22 is in the detain position, the lowermost fastener in the row of fasteners (10-1 in FIG. 5) abuts first arm 119. When escapement 22 pivots into the release position, first arm 119 withdraws from slot 106 and the row of headed fasteners 10 slides down slot 106 until the lowermost fastener 10-1 (FIG. 6) abuts second arm 120, which has rotated into position to block slot 106. As escapement 22 rotates back into the detain position, first arm 119 passes between lowermost fastener 10-1 and the next fastener 10-2 to allow the lowermost fastener 10-1 to slide down slot 106 into chute 112 while blocking passage of the next fastener 10-2.

In the arrangement of FIGS. 4-6, escapement 22 is operated by means of a substantially rectangular escapement link 126 having the first end thereof pivotally connected to the end of escapement 22 that is remote from second arm 120 and aligned with pivot bolt 118. In the depicted arrangement, the pivotable connection is formed by a bolt 124 that extends through aligned openings in escapement 22 and escapement link 126. The second end of escapement link 126 is pivotally attached to the top of an L-shaped connector 130 that extends downwardly with the juncture of the two legs being coupled to the plunger 129 of a solenoid 131 by a yoke 132. Sandwiched between the second end of escapement link 126 and the top of connector 130 is one end of the feeder fork 24. When solenoid 131 is activated and deactivated to move the connector 130 back and forth, escapement link 126 causes escapement 22 to swing about pivot bolt 118. As is shown in FIGS. 5 and 6, respectively, escapement 22 is in the detain position when the plunger 129 of solenoid 131 is extended and is in the release position when the plunger of solenoid 131 is retracted.

Activation and subsequent deactivation of solenoid 131 also causes feeder fork 24 to move between a detain position and a release position when the plunger 129 of solenoid 131 is extended (solenoid deactivated) and when the plunger of solenoid 32 is retracted (solenoid activated), respectively.

Figure 7:
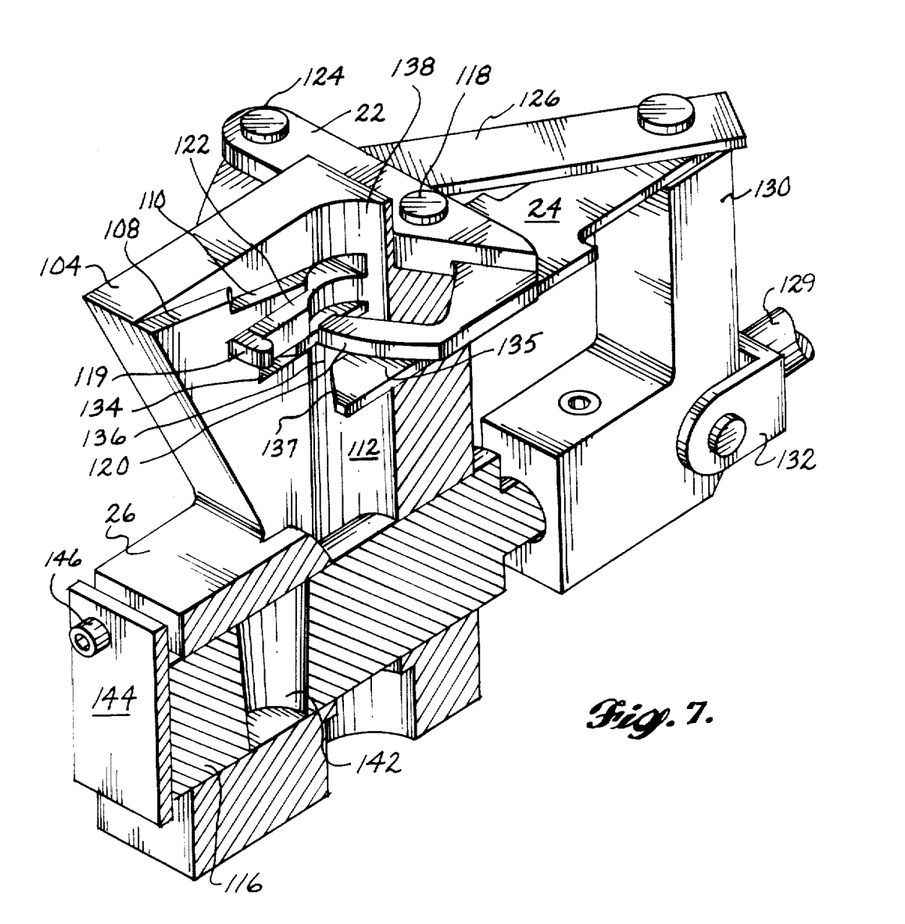
FIG. 7 is a perspective view of the gate unit with a portion of the unit cut away.

More specifically, as is shown in FIG. 7, feeder fork 24, which operates to permit passage of fasteners through chute 112, is mounted for sliding movement within gate body 26 at a position below the level of escapement 22 with a pair of spaced slots 134 that are positioned on either side of the gate body receiving the spaced apart parallel arms (135 in FIG. 7) of the feeder fork 24. The distance between parallel arms 135 of feeder fork 24 is established so that gap region 136 between parallel arms 135 is substantially parallel to slot 106, thereby allowing the shank of a headed fastener 10 that is in slot 106 to pass into gap region 136. When feeder fork 24 is in the detain position, parallel arms 135 obstruct chute 112 and prevent the passage of headed fasteners 10. When feeder fork 24 is in the release position, parallel arms 135 are retracted from chute 112, so that the chute is no longer obstructed. As best shown in FIG. 7, the ends of parallel arms 135 are formed with an inwardly facing bevel 137 to permit the parallel arms to easily slide around the shanks of headed fasteners 10 held in slot 106 as feeder fork 24 moves from the release to the detain position.

Lateral movement of feeder fork 24 is limited by a portion 138 of gate block 26 that resides between fork slots 134 when parallel arms 135 are within slots 134. A plate-like fork guide 139 is attached to each side of gate body 26 closing off slots 134 to further limit the lateral movement of feeder fork 24 (FIG. 4).

As shown in FIG. 4, a cylindrical air valve 116 that moves in a reciprocating manner within the air valve passage 114 of the gate body is attached to the forward portion of connector 130. Air valve 116 includes a frustoconically shaped passage 142 that aligns with chute 112 when the plunger 129 of solenoid 131 pulls the air valve rearward into its release position (escapement 22 and feeder fork 24 in release position). This allows a headed fastener 10 that is released by escapement 22 to pass completely through the gate body 26 and into feed tube 36. In its forwardmost position (FIG. 7), air valve 116 blocks chute 112 to prevent air from escaping out the chute when pressurized air is introduced in the pneumatic feed line 38 (FIG. 1) to urge a fastener 10 to the fastening machine. As shown in FIG. 4, an air valve stop 144 is attached to the forward end of gate body 26 by bolts 146 to limit the forward motion of air valve 116. Since air valve 116 and escapement 22 are driven in unison by connector 130, spacers 148 that are interposed between gate body 26 and air valve stop 144 establish the extent of the arcuate travel of escapement 22.

As illustrated in FIGS. 1 and 4, gate body 26 and solenoid 131 are attached to a mounting plate 152 by bolts 154 or other conventional means of attachment. A hole 156 in the mounting plate 152 interconnects with feed tube 36. When a headed fastener 10 is released by gate unit 18, the fastener travels down chute 112, through frustoconical passage 142 in air valve 116, and through hole 156 in the mounting plate to thereby pass into feed tube 36 in the manner shown in FIGS. 1 and 4. The headed fastener 10 travels through feed tube 36 into pneumatic feed line 38 (FIG. 1) and on to the fastening machine (not shown). Once headed fastener 10 enters pneumatic feed line 38, a short blast of air introduced into the pneumatic feed line urges the fastener on to the fastening machine.

Turning now to the more detailed aspects of the operation of the automatic delivery system of this invention, escapement 22 and feeder fork 24 cooperate in the following manner to eject a single headed fastener 10 each time solenoid 131 is activated to simultaneously drive escapement 22 and feeder fork 24. As shown in FIG. 5, prior to commencement of a fastener ejection cycle, solenoid 131 is de-energized with its plunger 129 extended. An assist spring 158, here a helical tension spring, urges connector 130 forward toward gate body 26 and escapement 22 into the detain position so that first arm 119 blocks gate slot 106 and prevents the forwardmost headed fastener 10-1 of the row of fasteners from moving down the gate slot to chute 112. Since feeder fork 24 is also attached to connector 130 and driven by solenoid 131, it is in its forwardmost or detain position. Energizing solenoid 131 causes the plunger 129 of solenoid 131 to be retracted, pulling connector 130 away from gate body 26. This causes escapement 22 to rotate so that first arm 119 withdraws from gate slot 106 and second arm 120 rotates through an arcuate path to a position across the gate slot, allowing the row of fasteners to advance one position so that fastener 10-1 drops down onto step 110 and abuts the second arm (FIG. 6). Pulling connector 130 away from gate body 26 by the activation of solenoid 131, pulls feeder fork 24 into its release position.

When solenoid 131 is de-energized, assist spring 158 urges connector 130 toward gate body 26, thereby causing escapement 22 to pivot so that second arm 120 withdraws from gate slot 106 and first arm 119 rotates through an arcuate path to a position between lowermost fastener 10-1 and nextmost fastener 10-1. This allows fastener 10-1 to slide down the gate slot 106 into chute 112. When connector 130 is urged toward gate body 26, feeder fork 24 also moves forward. The movement of escapement 22 and feeder fork 24 are coordinated so that parallel arms 135 of the feeder fork block chute 112 before fastener 10-1 enters the chute. Thus, fastener 10-1 is held for release within chute 112 by feeder fork 24 (FIG. 8) and a fastener ejection cycle is ready to begin.

Figure 8A:
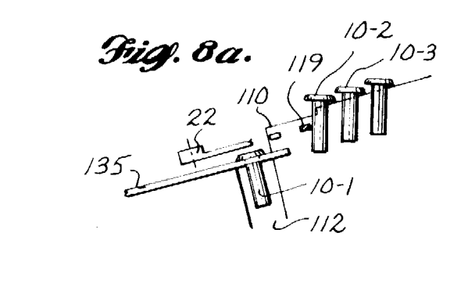
FIG. 8a is a schematic side elevational view of the components of FIG. 8.
Figure 9A:
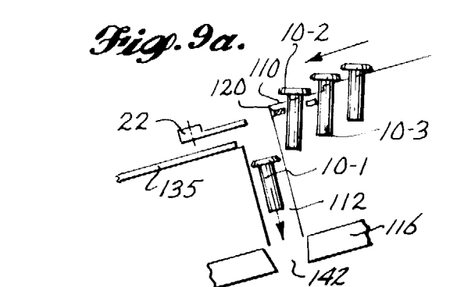
FIG. 9a is a schematic side elevational view of the components of FIG. 9.

FIGS. 8 to 10 illustrate a complete ejection cycle. Before ejection, fastener 10-1 is positioned within chute 112 and is supported by parallel arms 135 of feeder fork 24, which is in the detail position (FIGS. 8 and 8a). Escapement 22 is also in the detain position with first arm 119 blocking gate slot 106 to prevent movement of fastener 10-2, which is the lowermost fastener in the row of fasteners. To eject fastener 10-1 from gate unit 18, solenoid 131 is energized causing escapement 22 to pivot into the release position, wherein first arm 119 is withdrawn from gate slot 106 and second arm 120 rotates into position to block the gate slot (FIG. 9). When solenoid 131 is energized, feeder fork 24 is pulled into the release position, withdrawing parallel arms 135 from chute 112 and allowing fastener 10-1 to drop through the chute (FIG. 9a). Since air valve 116 is pulled into its release position when solenoid 131 is energized to align passage 142 with chute 112, fastener 10-1 is allowed to pass through gate body 26 and into feed tube 36. In addition, at this stage of the cycle (FIG. 9a), fastener 10-2 moves down gate slot 106 onto step 110 and into abutment with second arm 120.

Figure 10A:
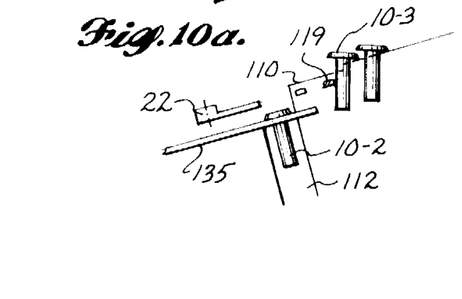
FIG. 10a is a schematic side elevational view of the components of FIG. 10.

When solenoid 131 is de-energized (FIG. 10), escapement 22 pivots back into the detain position, withdrawing second arm 120 from gate slot 106 and rotating first arm 119 across the gate slot between fasteners 10-2 and 10-3. Fastener 10-2 is thereby allowed to move down gate slot 106 toward chute 112 and the rest of the fasteners are prevented from advancing. Feeder fork 24 moves into its detain position as solenoid 131 is de-energized so that parallel arms 135 of the feeder fork once again block chute 112. Thus, fastener 10-2 does not pass downwardly through chute 112, but is stopped by parallel arms 135 of feeder fork 24 (FIGS. 10 and 10a) until another ejection cycle begins.

Figure 11:
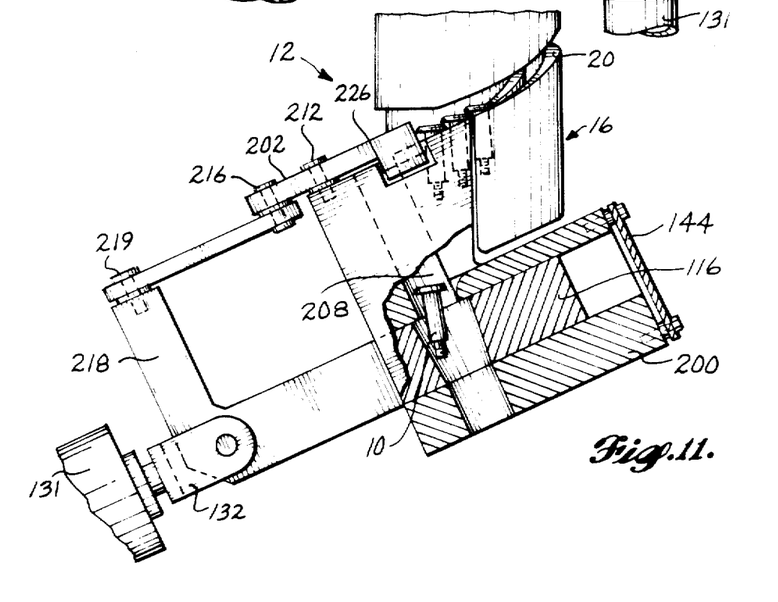
FIG. 11 is a side elevational view of an alternate embodiment of the gate unit with a portion of the gate unit cut away.
Figure 12:
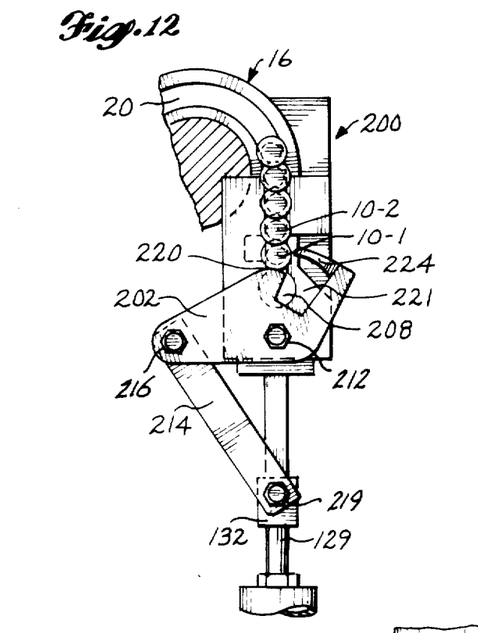
FIG. 12 is a plan view of the alternate embodiment of the gate unit with the escapement mechanism thereof being shown in a position that prevents fasteners from passing from the gate unit (detain position); and, FIG. 13 is a plan view of the alternate embodiment of the gate unit with the escapement thereof being shown in the position that allows passage of a single fastener (release position).
Figure 13:
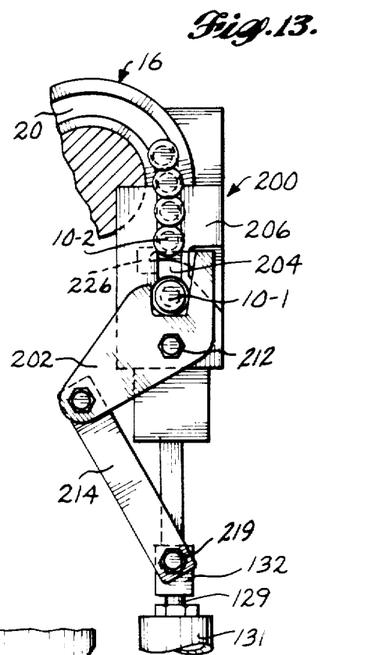

FIGS. 11, 12 and 13 depict a second embodiment of a gate body 200 and escapement 202 that can be used with spiral feeder assembly 12. While the second embodiment of a gate body and escapement is mechanically simpler than the preferred embodiment, it will not handle the range of different grip lengths that can be used with the preferred embodiment. As shown in the Figures, gate body 200 has the same general configuration as previously described gate body 26, in that gate body 200 attaches to the lower portion of feed column 16 with the upper surface 206 of the gate body 200 being inclined at approximately the same angle as delivery channel 20. Further, gate body 200 includes a gate slot 204 that is located in the upper surface 206 of the gate body and terminates at a chute 208 that extends downwardly through the gate body.

Escapement 202 is attached to upper surface 206 of gate body 200 by means of a pivot bolt 212. A first end of an escapement link 214 is attached to escapement 202 by means of a second pivot bolt 216 that is spaced away from the first pivot bolt 212 along the same edge of the escapement. The second end of escapement link 214 is attached to the top of an L-shaped connector 218 by a bolt 219. Connector 218 is mounted to a solenoid 131 by means of a yoke 132.

In the depicted embodiment of the invention, escapement 202 swings arcuately through a predetermined angle in a reciprocating manner to release a single fastener 10 each time solenoid 131 is activated. As shown in FIG. 12, when solenoid 131 is de-energized, i.e., with the plunger of the solenoid extended, escapement 202 is in a detain position with a portion 220 of the edge of the escapement that is across from first pivot bolt 212 obstructing gate slot 204. The lowermost fastener 10-1 in the row of fasteners in gate slot 204 is in abutment with portion 220, thus preventing the row of fasteners from advancing. Portion 220 is adjacent to a cut-away area 221 of escapement 202 that is configured to be in alignment with the upper end of chute 208 when the escapement is in a release position. The escapement 202 of FIGS. 11-13 includes a finger 224 that is positioned to move arcuately through a slot 226 that is located below the level of the upper surface 206 of the gate body 200. When solenoid 131 is energized, escapement 202 pivots from the detain position into the release position so that the curved finger 224 passes between the shanks of the lowermost fasteners 10-1 and 10-2 of the row of fasteners held in gate slot 204. When escapement 202 reaches the release position, lowermost fastener 10-1 passes through cut-away area 221 of escapement 202 and slides down gate slot 204 into chute 208. As is shown in FIG. 11, the ejected fastener 10-1 passes through an opening in an air valve 116 in the manner described relative to the embodiment of FIGS. 1-10.

The present invention has been described in relation to a preferred embodiment and variations upon that embodiment. One of ordinary skill, after reading the foregoing specifications, will be able to effect various changes, alternations, and substituents of equivalents without departing from the broad concepts disclosed. It is therefore intended that the scope of Letters Patent granted hereon be limited only by the definitions contained in the appended claims and equivalents thereof.

The embodiments of the invention in which an exclusive property or privilege is claimed are defined as follows:

1. A spiral feeder assembly for storing and delivering headed fasteners to a fastening machine, comprising:
    gate means for releasing one headed fastener at a time from said assembly; and:
    a cylindrical feed column attached to and extending upwardly from said gate means, said cylindrical feed column having a helical delivery channel for holding a series of said headed fasteners with all fasteners being oriented in substantially the same manner for delivery to said gate means, said helical delivery channel extending along and within the surface of said cylindrical feed column to provide a downwardly extending spiral passage for delivery of said headed fasteners to said gate means with said headed fasteners being movable along said spiral passage solely by the force of gravity.

2. The spiral feeder assembly of claim 1 further comprising:
    a cylindrical magazine for connection with said cylindrical feed column, said cylindrical magazine having a helical storage channel for holding a row of said headed fasteners, said cylindrical magazine being configured to mount to said cylindrical feed column with said helical storage channel of said cylindrical magazine aligned with said helical delivery channel of said cylindrical feed column to allow said fasteners to be transferred from said cylindrical magazine to said cylindrical feed column.

3. The spiral feeder assembly of claim 2 further comprising:
    release means for selectively blocking said helical storage channel when said magazine is detached from said feed column and unblocking said helical storage channel of said magazine when said magazine is mounted for connection to said feed column.

4. The spiral feeder assembly of claims 1, 2 or 3, wherein said gate means for releasing headed fasteners includes:
    a gate body, said gate body being attached to the base of said feed column and having a gate slot positioned for receiving said headed fasteners from said helical delivery channel, said gate slot configured to receive said headed fasteners at one end of said slot and to maintain said headed fasteners in an orientation that is substantially identical to the orientation established by said helical delivery channel, said gate body having a chute located at an end of said gate slot remote from the end of said slot receiving said fasteners, said chute passing completely through said gate body and sized to allow passage of said headed fasteners therethrough; and,
    escapement means mounted on said gate body for releasing one headed fastener at a time through said chute while maintaining said headed fastener in an orientation that is substantially identical to the orientation established by said helical delivery channel.

5. The spiral feeder assembly of claim 4, wherein said escapement means includes:
    an escapement pivotally attached to said gate body, said escapement pivoting in a reciprocating manner between a detain position wherein a headed fastener is prevented from passing through said chute in said gate body and a release position wherein a headed fastener is allowed to pass through said chute.

6. The spiral feeder assembly of claim 5, wherein said escapement means further includes:
    a feeder fork slidably mounted on said gate body, said feeder fork connected to said escapement for coordinated movement of said escapement and said feeder fork, said feeder fork configured to obstruct said chute when said escapement is in said detain position and allow passage of said fasteners through said chute when said escapement is in said release position.

7. The spiral feeder assembly of claim 6, wherein said escapement has at least one escapement arm that is configured to block said gate slot when said escapement is in the release position and prevent the passage of said headed fasteners therethrough.

8. The spiral feeder assembly of claim 7, wherein said gate body includes a step along the gate slot, said step configured to position a headed fastener on said step at a level lower than a headed fastener in said gate slot and thereby prevent binding between the two headed fasteners.

9. The spiral feeder assembly of claim 8, wherein said feed column has a cylindrical configuration with a top end and a bottom end, said helical delivery channel being located in the outer surface of said cylindrical feed column.

10. The spiral feeder assembly of claim 9, wherein said magazine has a cylindrical configuration with a top end and a bottom end, said helical storage channel being located in the outer surface of said magazine with said bottom end of said magazine being configured to mount to said top end of said feed column.

11. The spiral feeder assembly of claim 10, wherein said release means for selectively blocking and unblocking said helica storage channel includes:
- a radially extending, slidably mounted stop pin mounted in said magazine to extend across said helical storage channel and block the passage of said headed fasteners;
- mounting means for attaching said stop pin to said magazine;
- a release pin slidably mounted in said magazine, said release pin being connected to said mounting means and extending radially into said magazine, said magazine including an alignment aperture that extends upwardly from the bottom end of said magazine, said release pin extending into said alignment aperture when said stop pin extends across said helical storage channel;
- an alignment pin positioned on the top end of said feed column said alignment pin being received by said alignment aperture in said magazine when said magazine is connected to said feed column, said alignment pin urging said release pin radially outward to retract said stop pin from said helical storage channel.

12. A spiral feeder assembly for holding and releasing headed fasteners to a fastening machine, comprising:
- a gate means for storing and releasing headed fasteners, said gate means including means for releasing headed fasteners one at a time in a predetermined orientation;
- a cylindrically shaped feed column attached to said gate means, said feed column having a helical delivery channel extending along the surface of said feed column, said helical delivery channel being configured to supply headed fasteners to said gate means in said predetermined orientation; and,
- a cylindrically shaped magazine adapted for interconnection with said feed column, said magazine having a helical storage channel extending along the surface thereof, said storage channel for holding a plurality of headed fasteners in said predetermined orientation, said storage channel being aligned with said delivery channel in said feed column when said magazine is attached to said feed column.

13. The spiral feeder assembly of claim 12, wherein said gate means comprises:
- a gate body connected to said feed column for receiving headed fasteners from said delivery channel of said feed column, said gate body having a gate slot for receiving said fasteners and a chute that is sized to receive said fasteners, said slot extending to said chute; and
- an escapement that is pivotally mounted to said gate body, said escapement pivoting between a first position wherein said headed fasteners are prevented from entering said chute and a second position wherein one of said headed fasteners is allowed to enter said chute.

14. The spiral feeder assembly of claim 13, wherein said escapement has at least one escapement arm that is configured to block said gate slot when said escapement is in the second position and prevent the passage of said headed fasteners therethrough.

* * * * *